United States Patent
Cama et al.

(10) Patent No.: US 9,799,035 B2
(45) Date of Patent: Oct. 24, 2017

(54) CUSTOMER FEEDBACK ANALYZER

(71) Applicant: International Business Machines Corporation, Armonk, NY (US)

(72) Inventors: Karl J. Cama, Coppell, TX (US); Norbert Herman, Denver, CO (US); Daniel Lambert, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 14/037,968

(22) Filed: Sep. 26, 2013

(65) Prior Publication Data

US 2015/0088608 A1    Mar. 26, 2015

(51) Int. Cl.
*G06Q 10/00* (2012.01)
*G06Q 30/00* (2012.01)
*G06Q 30/02* (2012.01)
*G06Q 50/00* (2012.01)

(52) U.S. Cl.
CPC ............. *G06Q 30/00* (2013.01); *G06Q 30/02* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 5,537,618 A | 7/1996 | Boulton et al. | |
| 7,930,302 B2 * | 4/2011 | Bandaru et al. | 707/737 |
| 8,977,620 B1 * | 3/2015 | Buryak et al. | 707/737 |
| 2006/0155642 A1 | 7/2006 | Pettersen | |
| 2007/0214000 A1 * | 9/2007 | Shahrabi | G06Q 10/063 705/1.1 |
| 2007/0226202 A1 * | 9/2007 | Cava | 707/4 |
| 2009/0030862 A1 | 1/2009 | King et al. | |
| 2010/0049590 A1 | 2/2010 | Anshul | |
| 2011/0276406 A1 | 11/2011 | Sneyders | |
| 2013/0275451 A1 * | 10/2013 | Lewis et al. | 707/758 |
| 2014/0072939 A1 * | 3/2014 | Dahan | G06Q 50/24 434/262 |

FOREIGN PATENT DOCUMENTS

WO    2009050529    4/2009

OTHER PUBLICATIONS

Lin et al.; Using Key Sentence to Improve Sentiment Classification; Information Retrieval Technology, Lecture Notes in Computer Science, vol. 7097; 7th Asia Information Retrieval Societies Conference, AIRS 2011, Dec. 18-20, 2011; pp. 422-433.

* cited by examiner

*Primary Examiner* — Stephanie Delich
(74) *Attorney, Agent, or Firm* — Schmeiser, Olsen & Watts; Michael A. Petrocelli (57) ABSTRACT

A method and system for analyzing customer feedback is provided. The method includes accessing a keyword and word mapping database and receiving consumer feedback data associated with a product or service. The consumer feedback data includes feedback data groups. Each group is divided into segments based on word analysis. Each segment is analyzed with respect to the keyword and thesaurus database. A score is generated for each segment and a composite score is generated for each feedback data group. Each composite score is stored.

15 Claims, 7 Drawing Sheets

CUSTOMER FEEDBACK ANALYZER

FIELD

The present invention relates generally to a method for analyzing customer feedback, and in particular to a method and associated system for using metrics applied to customer feedback analysis.

BACKGROUND

Determining customer satisfaction typically includes an inaccurate process with little flexibility. Evaluating a customer experience may include a complicated process that may be time consuming and require a large amount of resources. Accordingly, there exists a need in the art to overcome at least some of the deficiencies and limitations described herein above.

SUMMARY

A first aspect of the invention provides a method comprising: accessing, by a computer processor of a computing system, a keyword and word mapping database; receiving, by the computer processor, consumer feedback data associated with a product or service, wherein the consumer feedback data comprises feedback data groups, each of the feedback data groups being associated with a data source; dividing, by the computer processor based on word analysis, each group into a plurality of segments, wherein each segment of each the plurality of segments for each group is associated with a category of a list of categories; analyzing, by the computer processor executing a psycholinguistic scoring engine with respect to the keyword and word mapping database, each segment of each the plurality of segments for each group; generating, by the computer processor based on results of the analyzing, a score for each segment of each the plurality of segments for each group; and generating, by the computer processor, a composite score for each group based on each score for each segment of each the plurality of segments for each group.

A second aspect of the invention provides a computing system comprising a computer processor coupled to a computer-readable memory unit, the memory unit comprising instructions that when executed by the computer processor implements a method comprising: accessing, by the computer processor, a keyword and word mapping database; receiving, by the computer processor, consumer feedback data associated with a product or service, wherein the consumer feedback data comprises feedback data groups, each of the feedback data groups being associated with a data source; dividing, by the computer processor based on word analysis, each group into a plurality of segments, wherein each segment of each the plurality of segments for each group is associated with a category of a list of categories; analyzing, by the computer processor executing a psycholinguistic scoring engine with respect to the keyword and word mapping database, each segment of each the plurality of segments for each group; generating, by the computer processor based on results of the analyzing, a score for each segment of each the plurality of segments for each group; and generating, by the computer processor, a composite score for each group based on each score for each segment of each the plurality of segments for each group.

A third aspect of the invention provides a computer program product for analysis, the computer program product comprising: one or more computer-readable, tangible storage devices; program instructions, stored on at least one of the one or more storage devices, to access a keyword and word mapping database; program instructions, stored on at least one of the one or more storage devices, to receive consumer feedback data associated with a product or service, wherein the consumer feedback data comprises feedback data groups, each group of the feedback data groups being associated with a data source; program instructions, stored on at least one of the one or more storage devices, to divide based on word analysis, each group into a plurality of segments, wherein each segment of each the plurality of segments for each group is associated with a category of a list of categories; program instructions, stored on at least one of the one or more storage devices, to analyze by a computer processor executing a psycholinguistic scoring engine with respect to the keyword and word mapping database, each segment of each the plurality of segments for each group; program instructions, stored on at least one of the one or more storage devices, to generate, based on results of the analysis, a score for each segment of each the plurality of segments for each group; and program instructions, stored on at least one of the one or more storage devices, to generate a composite score for each group based on each score for each segment of each the plurality of segments for each group.

The present invention advantageously provides a simple method and associated system capable of determining customer satisfaction.

DETAILED DESCRIPTION

Figure 1:
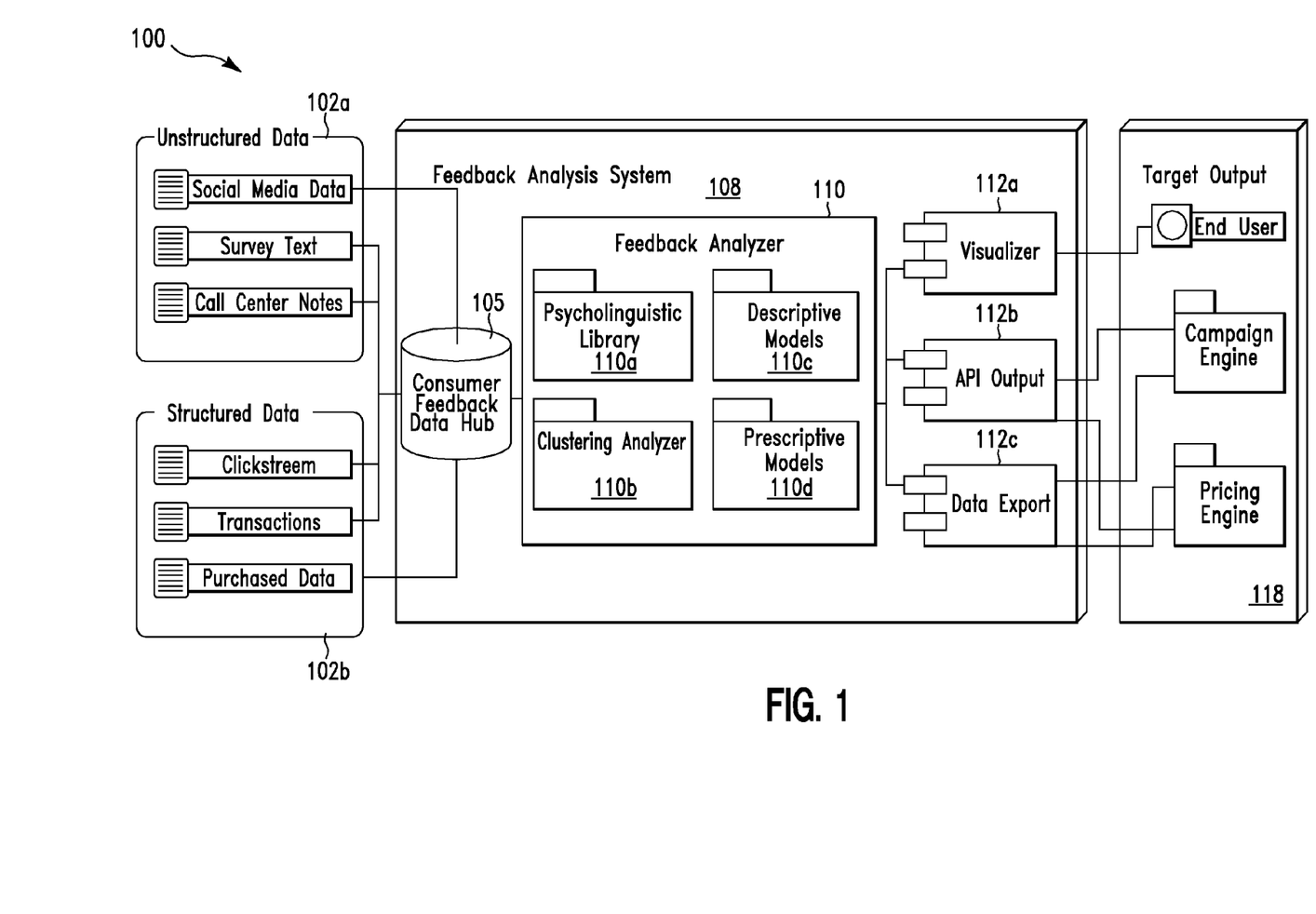
FIG. 1 illustrates a system for providing a means for analyzing customer feedback with respect to a product or service, in accordance with embodiments of the present invention.
Figure 2A:
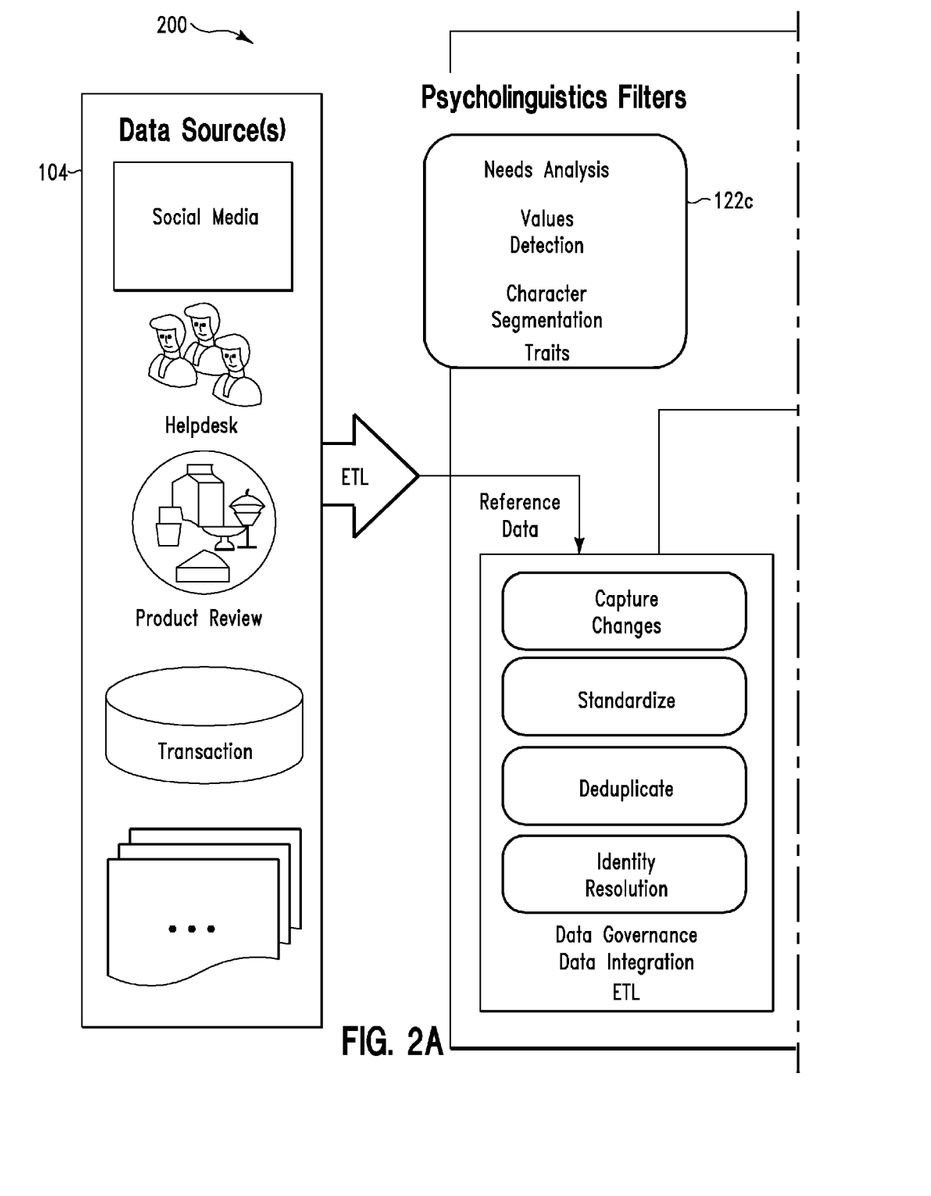
FIGS. 2A-2D illustrate an internal view system for providing a means for analyzing customer feedback with respect to a product or service, in accordance with embodiments of the present invention.
Figure 2B:
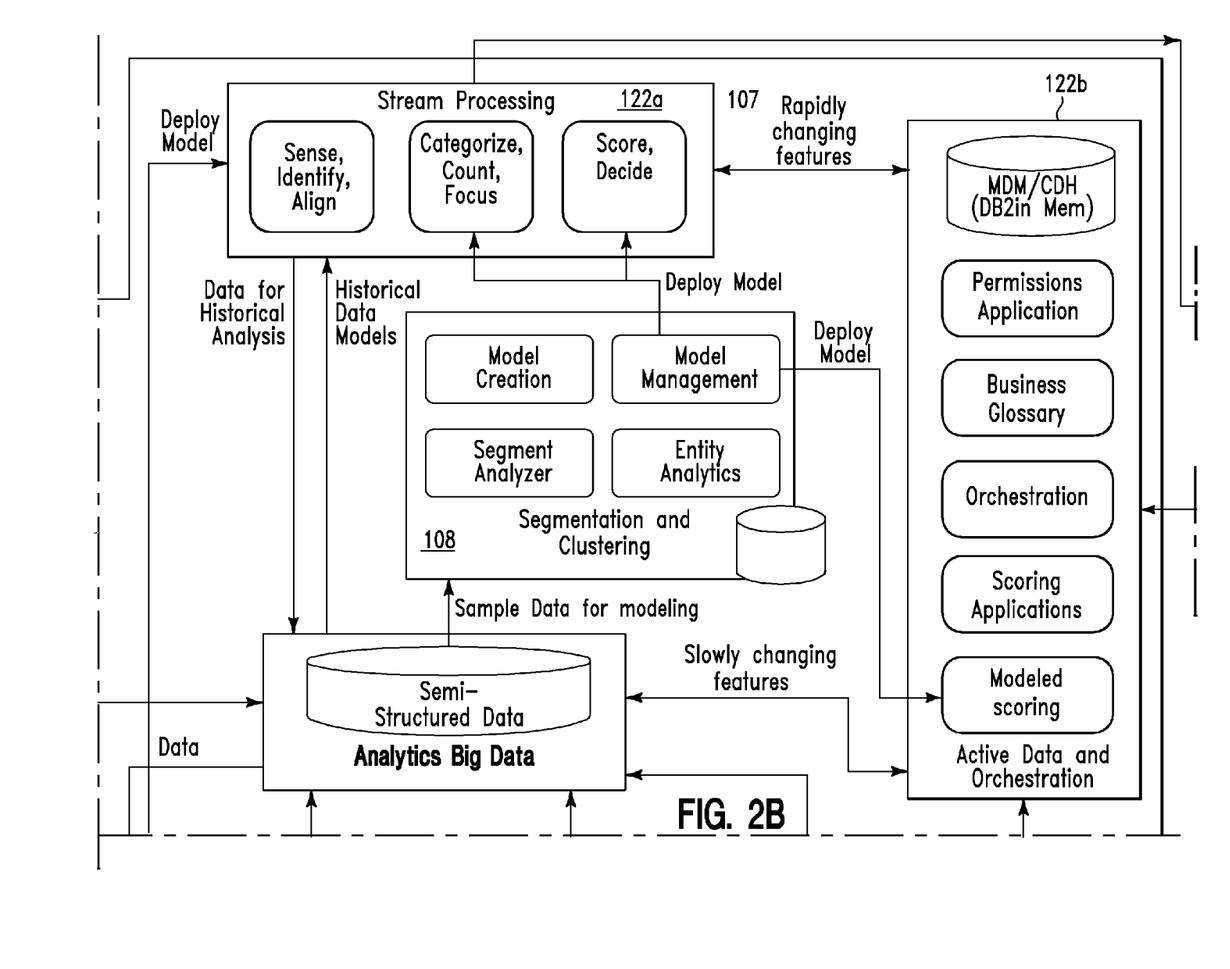
Figure 2C:
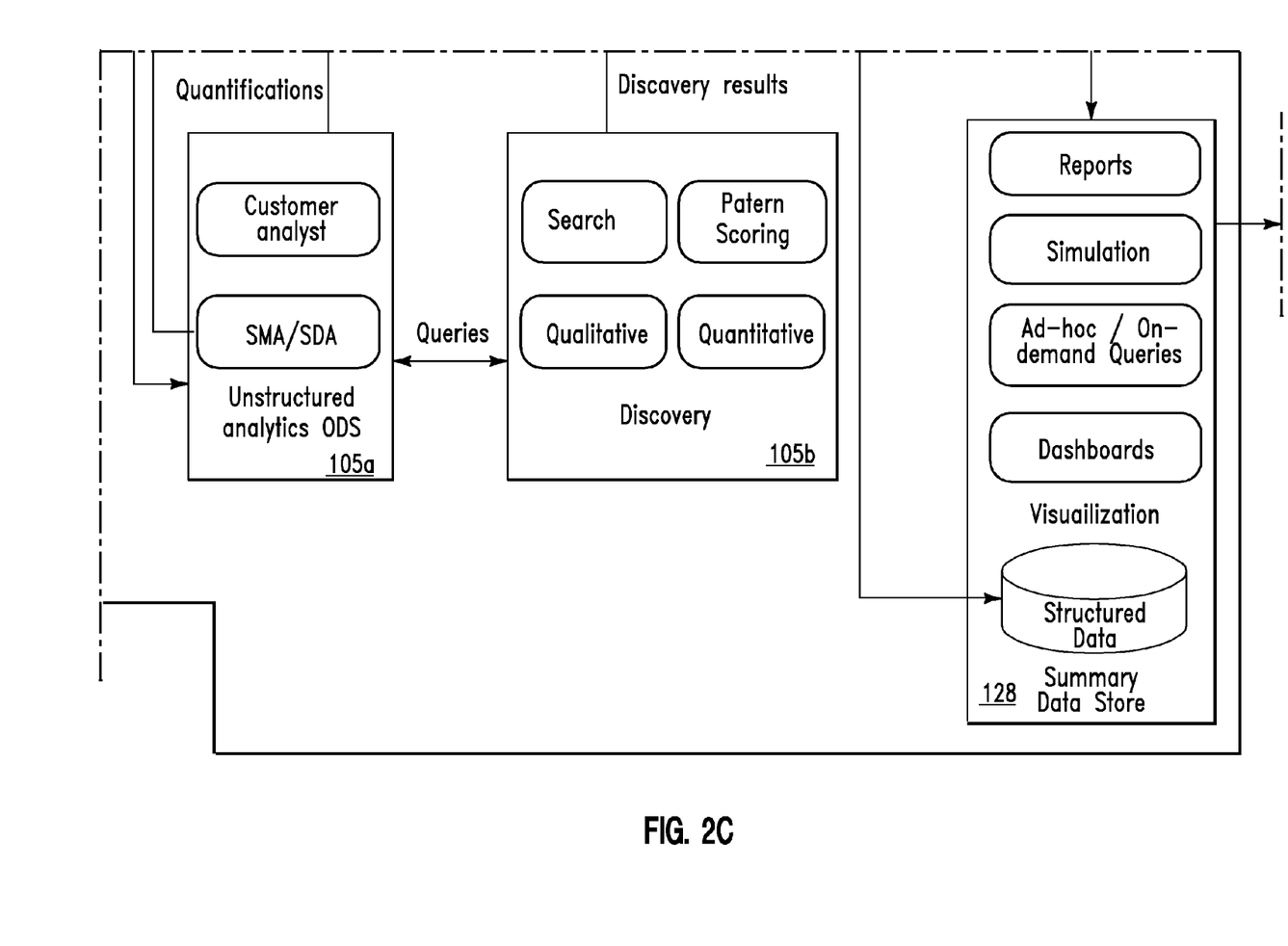
Figure 2D:
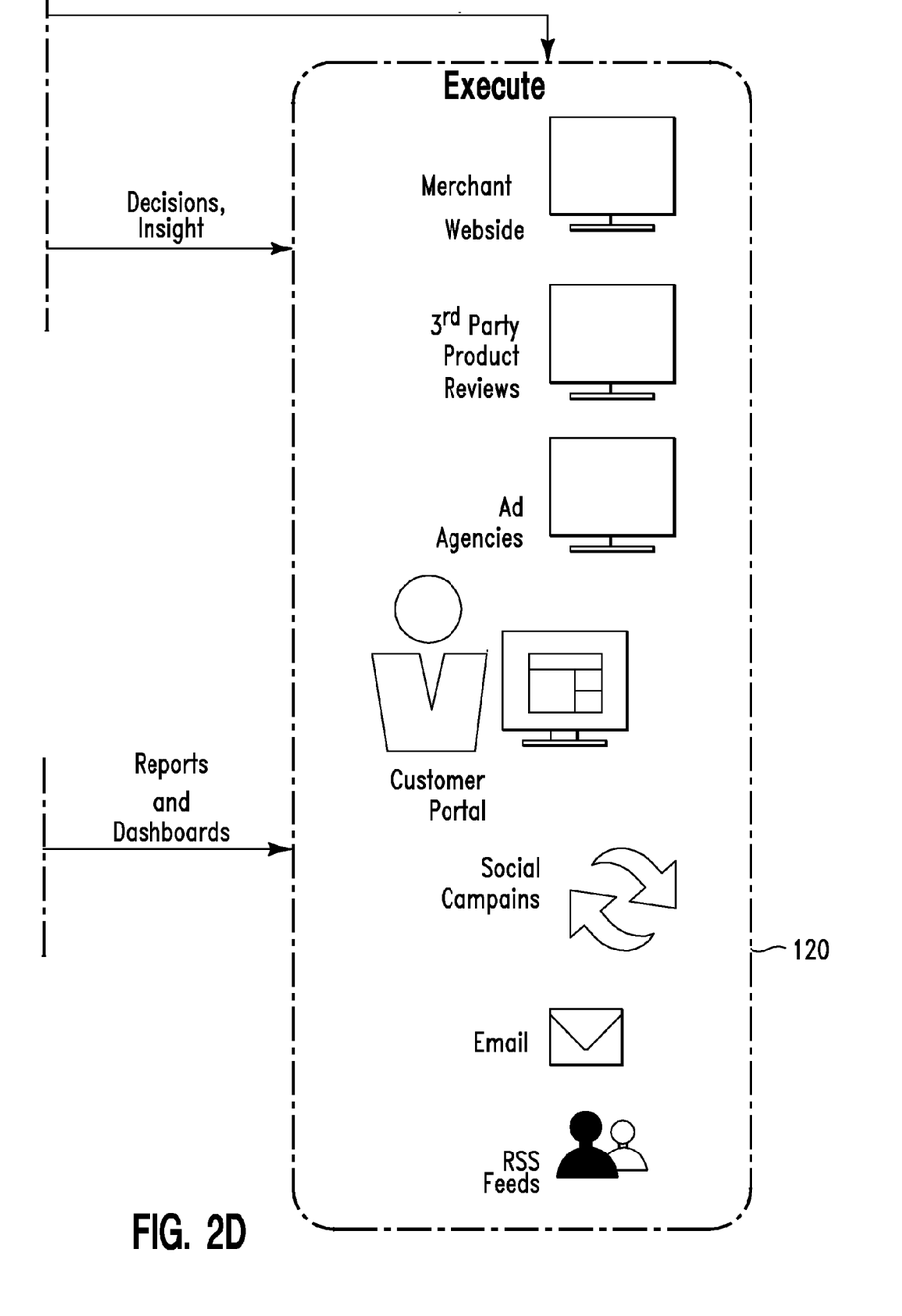

FIG. 1 illustrates a system 100 for providing a means for analyzing customer feedback with respect to a product or service, in accordance with embodiments of the present invention. The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or any type of programming languages such as, inter alia, an assembly language. The program code can execute entirely on the user's device, partly on the user's device, as a stand-alone software package, partly on the user's device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function (s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

System 100 of FIG. 1 includes a feedback analysis system 108 retrieving unstructured data 102a and structured data 102b for analysis and transmitting results of the analysis to a target output 118. Feedback analysis system 108 includes consumer feedback data hub 105 (comprising consumer feedback data with respect to a product or service purchase), feedback analyzer 110 (to analyze the feedback data), visualizer component 112a, API output component, and data export component (for exporting data from system 100). Visualizer component 112a displays outcomes of data modeling with respect to feedback data. For example, a "5 stars" outcome rating for one category or a "thumbs up" outcome rating for another category. API output component 112b retrieves results from the outcome rating and bundles the results for feedback into another site. Feedback analyzer 110 includes a psycholinguistic library 110a, a clustering analyzer 110b, descriptive models 110c, and prescriptive models 110d. Psycholinguistic library 110a includes a set of keywords and phrases indicating positive and negative sentiments with respect to a product or service (i.e., a sentiment analysis). Clustering analyzer 110b groups similar comments to create composite scores. Descriptive models 110c quantify a current state of a data sample in question as described further, infra. Prescriptive models 110d generate suggestions in accordance with defining how various components should work according to an assumption or standard as described further, infra. System 100 enables a software solution to ingest consumer feedback from structured data 102a (e.g., survey data, scored consumer reports, transaction data reflecting value points, etc.) and unstructured data 102b (e.g., product reviews, social network data, customer service records with open text and voice to text insights, etc.). The unstructured data 102a and structured data 102b is analyzed by a psycholinguistic scoring process to derive an accurate positive or negative score across a core of dimensions of, inter alia, price, fashion value, transaction experience, service value, delivery on product promise, etc. Analytical models are used to derive a score on a product accommodating a cognitive dissonance found in product reviews associated with consumer reviews for products that are not in line with standard actions and rational beliefs. The review scores are derived (via executing descriptive models leveraging psycholinguistic library 110a) using psycholinguistic analytical models to interpret a review's credibility. Additionally descriptive models 110c and prescriptive models 110d provide a sentiment and value analysis.

System 100 retrieves consumer feedback data from online retailers. The consumer feedback data includes information describing a purchased product or service and associated experiences. The consumer feedback data is retrieved from quantifiable formats (e.g., multiple-choice surveys) and qualifiable formats (e.g., textual feedback). Additionally, the consumer feedback data may include multiple associated data. The consumer feedback data is analyzed to derive accurate feedback on a product or service. The consumer feedback data is assembled and analyzed for aggregate patterns and trends on a value of products or services thereby deriving suitable offers made to consumers.

System 100 retrieves structured data 102a (e.g., consumer reports, clickstream information, transaction information, etc.) and unstructured data 102b for mapping into consumer feedback data hub 105. Social networking data may be purchased based on pre-determined filters to ensure a best set of data. Feedback analysis system 108 processes the retrieved data based on business filters that are adjusted to maximize generated values. Ingestion filters may be used as a pre-process to ensure an increased accuracy of an output.

An output generated by feedback analyzer 110 is provided across five key categories:
1. A transaction experience determining how a consumer interpreted a process of purchasing a product or service.
2. A price specifying a value for money exchanged.
3. A fashion determining an insight as to whether a product or service is rated based on trending.
4. A service describing feedback on a type of service received after a transaction has been completed.
5. Delivery on promise determining a satisfaction level with respect to, inter alia, a product, a service, etc.

Unstructured data 102b retrieved from consumer feedback is analyzed using clustering models and psycholinguistic categorization. The analysis executes a factor model of personality traits to provide a clustered output in terms of, inter alia: extraversion, agreeableness, conscientiousness, neuroticism, openness to experience, etc. An output of the clustering process (executed by system 100) generates a breakdown of positive and negative feedback with associated variables illustrating a degree of the results (i.e., on a 0-1 scale for both categories). The clustering output is analyzed by descriptive models 110c and prescriptive models 110d to generate results necessary for an accurate interpretation of product/service review and recommended steps for improvement. Table 1 below illustrates an example of quantitative scoring that may be applied to natural language.

TABLE 1

| | | |
|---|---|---|
| Negative Emotions | 0.0189 | 0.002 |
| 1st Person | 0.0528 | 0.0605 |
| Leisure | 0.009 | 0.0047 |
| Music | 5.00E-04 | 0.0057 |
| Humans | 0.0024 | 0.0082 |
| Assertiveness | 0 | 0.0256 |
| Sadness | 0.0061 | 0.0028 |
| Tentative | 0.0207 | 0.0518 |
| Achievement | 0.0184 | 0.0104 |
| Hearing | 0.0047 | 0.0019 |
| Touch | 0.0019 | 0.0094 |
| Numbers | 0.0052 | 0.0466 |
| Discrepancy | 0.0226 | 0.007 |
| Optimism | 0.0028 | 0.0117 |
| 2nd Person | 0.0179 | 0.0266 |

Descriptive models 110c (used in the analysis) identify a relationship among all the reviews in order to rank an output for decision making. Correlations between structured data 102b and unstructured data 102a are determined to describe an accuracy of reviews. For example, if a product receives a statistically significant positive score in terms of likes, scores from surveys, and mentions on social media, but an analysis of feedback comments reveal dissatisfaction in a transaction experience as well as delivery on promise, it may be deduced that an overall score may be positive, but changes are necessary with respect to future purchases.

Prescriptive models 110d (used in the analysis) generated a clustered output resulting with specific suggestions as to which parameters should be addressed for the analyzed reviews. Using pre-defined business rules for a type of customer feedback decision interpretations, prescriptive models 110d analyze the reviews with the help of the constraints, preferences, policies, best practices, and boundaries provided by a business user.

FIGS. 2A-2D, illustrate a detailed internal view 200 of system 100 in FIG. 1 for providing a means for analyzing customer feedback with respect to a product or service, in accordance with embodiments of the present invention. System 100 retrieves data from a multiple data sources 104. The data is identified and structure is added to the data. The data is processed with respect to historical models to determine if patterns match with historical data. Additionally, consumers are analyzed (e.g., what type of customer they are, what their preferences are, etc.). Same type actual messages are grouped together and customer profile data, historical comparison model (scores), and clusters messages are retrieved and used that to conduct modeled scoring. An output from the aforementioned process is saved and communicated back to a client, data stores etc.

System 100 comprises input data sources 104, analytics modules 107, and output results 120. Analytics modules 107 comprise social media analytics modules 105a and 105b, model based analytics module 108 (e.g., behavioral scoring, micro segmentation, correlation detection analysis, etc.), scoring modules 122a . . . 122c (e.g., real time scoring, classification using psycholinguistics, etc.), and visualize modules 128.

Social media analytics modules 105a and 105b retrieve social media based data for supplementing an original review posting. For example, an original review posting on a specific Website may include disparaging reviews with respect to a product or service. Likewise, social Websites may include many positive comments/reviews with respect to the same product or service. Therefore, both sets of reviews must be taken into account and weighted via social media analytics modules 105a and 105b configured to collect both sets of reviews and generate an appropriate weighting.

Model based analytics module 108 reviews previous information that has been used to classify review posts. For example, an initial model (with respect to a restaurant review) is generated based on best guesses as to scoring and refined human feedback. Therefore, the initial model comprises a best guess as to how the restaurant should be rated. Model based analytics module 108 refines the initial model by defining what factors should have identified as a correct scoring process for the restaurant. Model based analytics module 108 reviews models that have been refined over several iterations of previous restaurant reviews to generate approximations of different scores. A micro-segmentation process (executed by model based analytics module 108) comprises a process of grouping similar clusters of customers together, determining associated feedback, and using retrieved information to target future customers within a same micro-segment.

Scoring modules 122a-122c generate real time scores based on various metrics including, inter alia, psycholinguistics (i.e., reviewing word frequency to determine positive or negative sentiment weighting). A sentiment weighting determines if a reviewer is apathetic with respect to a product or service, or mistrusts' a product or service. The sentiment weighting is captured through phrasing pattern analysis, use of pronouns, etc.

Real time scores are generated automatically calculating and displaying instantaneous scores across different dimensions (e.g., service, ambience, etc.) as soon a review is detected. The real time scores are generated by performing a comparison process with respect to negative and positive keywords, adverbs, and adjectives. Additionally, scoring modules 122a-122c retrieve a count of positive and negative to determine if a score comprises a negative or positive score.

The following steps describe an implementation example executed by system 100 for analyzing a restaurant to determine performance with respect to multiple dimensions such as ambiance, service, price/value, quality of food, and location.

1. A source stream (comprising feedback data) is identified by an individual (e.g., social media streams related to the restaurant. The social media streams may be determined by a fixed URL structure, hash tags, handles a location mention structure, etc.
2. Comments from the source stream are stored on a server (e.g., an unstructured data management system).
3. Each comment is divided into segments. Each segment is associated with one of the multiple dimensions (i.e., categories) as described, supra. For example (with respect to price), keywords such as "dollars", "$$", "value", etc. are identified. As an additional example (with respect to service), keywords such as "waiter", "waitress", "hostess", etc. are identified. Depending on specified category, a radius around the keyword may be created to ingest descriptors associated with a keyword.
4. A radius may or may not comprise a fixed number of words. For example, punctuation, spacing, and other areas may change the radius in one direction or another (e.g., dependent on a dimension). In this example, the radius is pre-programmed based on the dimension, but alternatively the radius may be determined via machine learning.
5. When a comment has been segmented, each segment is evaluated independently using a psycholinguistic scoring engine. The psycholinguistic scoring engine evaluates word frequency, phrasing, and sentiment analysis to determine an overall opinion as described in table 2 below. Sentiment analysis gauges an emotion of a writer (i.e., of reviews for a product or service) by detecting the strength of language used (e.g., use of vulgar language versus use of descriptive words, etc.)

TABLE 2 qCrowd Personality score

| Attribute | Scores | Mean Scores (N~10K) |
|---|---|---|
| Neuroticism | 0 | 0.0036 |
| Nonfl | 5.00E−04 | 0.0041 |
| Affect | 0.0424 | 0.014 |
| Trust | 0 | 0.0124 |
| Cautiousness | 0 | 0.0021 |
| Agreeableness | 0 | 0.0147 |
| Emotionality | 0 | 0.0203 |
| Self-consciousness | 0 | 0.0335 |
| Swearing | 0.0028 | 0.0815 |
| Religion | 9.00E−04 | 0.0044 |
| Activity level | 0 | 0.0295 |
| Death | 9.00E−04 | 0.0078 |
| Sexual | 0.0019 | 0.0113 |
| Inhibition | 0.0033 | 0.0417 | note:
big 5 personality traits in bold

6. After the scoring process has been complete, all factors are weighted (based on a pre-defined weighting for different dimensions) and a score out of any variable is generated for each of the dimensions. A weighting process may include a process for reviewing a number of words that surround an object in question (e.g., a waiter). Therefore, if there is only one sentence describing the waiter, the reviewer weighted less than reviewer that wrote paragraphs about the waiter.
7. The weighted scores are stored in a structured repository.

Figure 3:
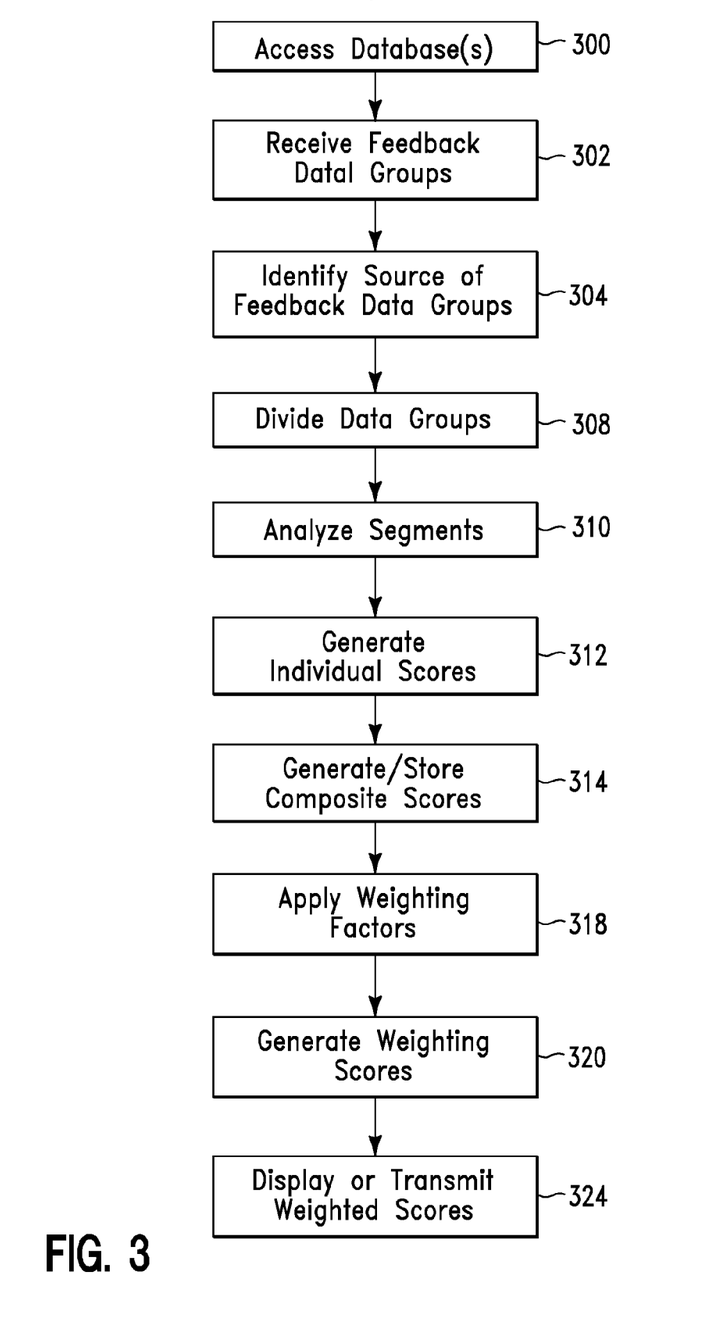
FIG. 3 illustrates an algorithm detailing a process flow enabled by the systems of FIGS. 1 and 2 for providing a means for analyzing customer feedback with respect to a product or service, in accordance with embodiments of the present invention.

FIG. 3 illustrates an algorithm detailing a process flow enabled by system 100 of FIG. 1 and FIG. 2 for providing a means for analyzing customer feedback with respect to a product or service, in accordance with embodiments of the present invention. Each of the steps in the algorithm of FIG. 3 may be enabled and executed in any order by a computer processor executing computer code. In step 300, a keyword and mapping database (e.g., psycholinguistic library 110a of FIG. 1) is accessed by a computer processor. In step 302, consumer feedback data associated with a product or service is received from consumer feedback data hub 105 of FIG. 1. The consumer feedback data includes feedback data groups. Each group is associated with a data source. The consumer feedback data may include structured data and unstructured data. The structured data may include, inter alia, survey data, consumer reports data, transaction data, etc. The unstructured data may include, inter alia, product/service review data, social media data, call-in data, call center data, service record data, etc. In step 304, a source for each feedback data group is identified by feedback analyzer 110 of FIG. 1. In step 308, each feedback data group is divided into a plurality of segments based on a word analysis process executed by feedback analyzer 110. Each segment for each feedback data group is associated with a different category. Categories may include, inter alia, a transaction experience category, a price category, a fashion category, a service category, a delivery category, etc. In step 310, each segment for each feedback data group is analyzed by the computer processor executing a psycholinguistic scoring engine (of feedback analyzer 110) with respect to the keyword and mapping database. The analysis may include:

1. Performing a text analysis process with respect to text within each segment for each feedback data group.
2. Generating a radius around a keyword within the text. The radius may be generated based on: a fixed number of words associated with the keyword, punctuation associated with the keyword, a context change associated with the keyword, and/or spacing associated with the keyword. The context change may include a change of nouns used with respect to the keyword.

In step 312, a score for each segment of each of the plurality of segments for each feedback data group is generated by feedback analyzer 110. Each score may be generated based on, inter alia, an analysis of word frequency in the consumer feedback data, an analysis of phrasing in the consumer feedback data, sentiment analysis of the consumer feedback data (i.e., as described with respect to the description of FIGS. 2A-2D, supra), etc. Each score may include a scoring range (i.e., comprising a bounds for scores dependent on a product or service in question). For example, instead of a score being 3.5 out of 5, the system could estimate that a true score resides between 3.2 and 3.8. In step 314, a composite score for each feedback data group is generated (and stored by feedback analyzer 110) based on each score for each segment of each the plurality of segments. In step 318, a weighting factor is applied to each score for each segment for each feedback data group. In step 320, a weighted score for each score for each segment of each plurality of segments for each feedback data group is generated (by feedback analyzer 110) based on the application of weighting factors from step 318. In step 324, each weighted score is displayed and/or transmitted through an application program interface (i.e., API output component 112b).

Figure 4:
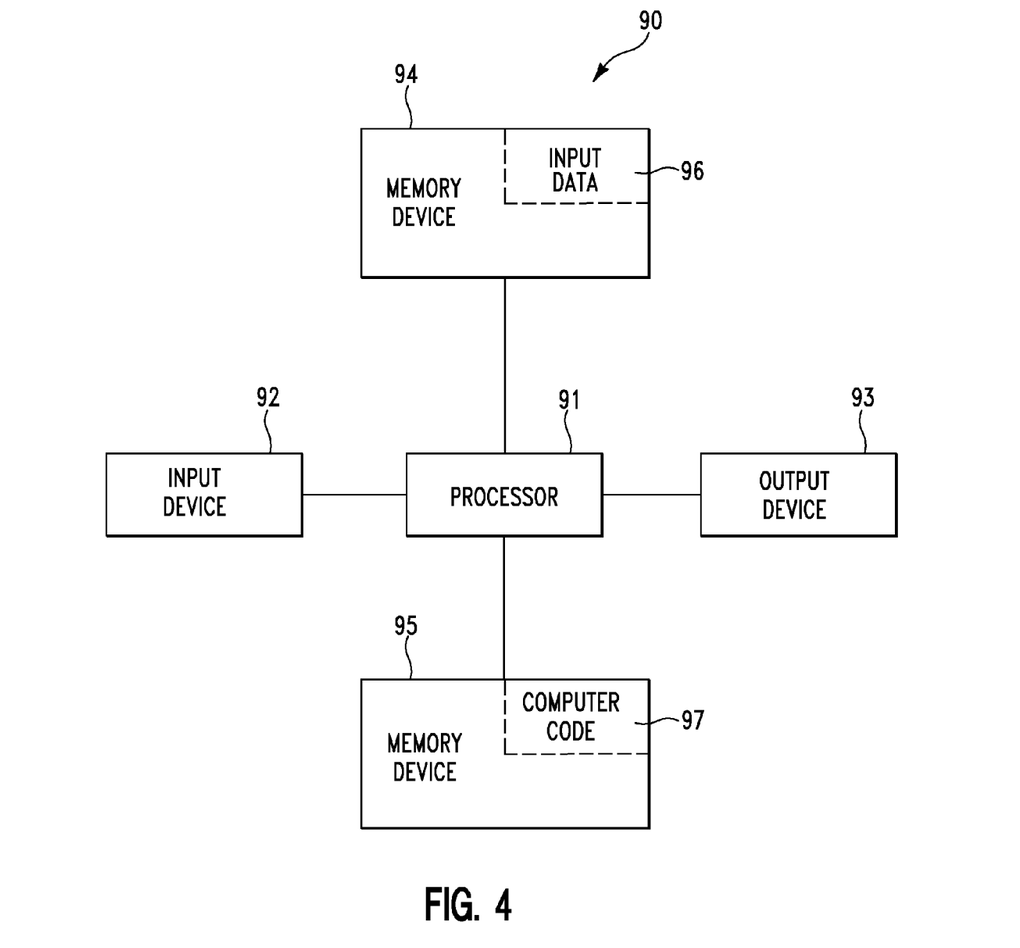
FIG. 4 illustrates a computer apparatus used by the systems of FIG. 1 and FIG. 2 for providing a means for analyzing customer feedback with respect to a product or service, in accordance with embodiments of the present invention.

FIG. 4 illustrates a computer apparatus 90 (e.g., computing systems used to implement system 100 of FIG. 1 and system 200 of FIG. 2) for providing a means for analyzing customer feedback with respect to a product or service, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for providing a means for analyzing customer feedback with respect to a product or service. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithm of FIG. 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to provide a means for analyzing customer feedback with respect to a product or service. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for providing a means for analyzing customer feedback with respect to a product or service. In another embodiment, the invention provides a business method that performs the process steps of the invention on a subscription, advertising, and/or fee basis. That is, a service supplier, such as a Solution Integrator, could offer to provide a means for analyzing customer feedback with respect to a product or service. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A social media network stream feedback improvement method comprising:
    accessing, by a computer processor of a computing system comprising a feedback analysis system, a keyword and word mapping database comprising keywords and phrases indicating positive and negative sentiments with respect to products and services;
    identifying a source social media data stream via a fixed URL structure and associated hashtags;
    receiving, by said computer processor, said source social media data stream comprising consumer feedback data associated with a product or service, wherein said consumer feedback data comprises feedback data groups, each of the feedback data groups being associated with a data source, wherein said consumer feedback data comprises structured data and unstructured data, and wherein said consumer feedback data comprises voice to text converted data;

mapping, by said computer processor, said structured data and unstructured data into a consumer data feedback hub;

dividing, by said computer processor based on word analysis, each said group into a plurality of segments, wherein each segment of each said plurality of segments for each said group is associated with a category of a list of categories;

analyzing, by a feedback analyzer executing a psycholinguistic scoring engine with respect to said keyword and word mapping database, each segment of each said plurality of segments for each said group, wherein said analyzing comprises;

performing a text analysis process with respect to text within each segment of each said plurality of segments for each said group; and     generating via a machine learning process, by a machine learning circuit, a preprogrammed radius around a keyword within said text, wherein said preprogrammed radius is generated based on: a fixed number of words associated with said keyword, punctuation associated with said keyword, a context change associated with said keyword, or spacing associated with said keyword;

comparing, by social media analytics circuits, multiple Website reviews from multiple users;

generating, by said computer processor, a quantitative scoring natural language based table comprising a first plurality of rows and a first plurality of columns intersecting said first plurality of rows to define social media based attributes associated with said Website reviews with respect to quantitative scores associated with said consumer feedback data, wherein said table configures storage of said social media based attributes associated with said Website reviews with respect to said quantitative scores;

determining, by said computer processor executing said psycholinguistic scoring engine with respect to said Website reviews, emotions of said multiple users;

instantaneously generating, by said computer processor based on results of said analyzing, said comparing, and said determining said emotions, a real time weighted score for each segment of each said plurality of segments for each said group;

generating, by a clustering analyzer of said feedback analyzer, a composite score for each said group based on each said score for each segment of each said plurality of segments for each said group;

generating, by said computer processor, an opinion based table comprising a second plurality of rows and a second plurality of columns intersecting said second plurality of rows to define social media based opinions associated with said Website reviews and said emotions with respect to each said composite score, wherein said opinion based table configures storage of said social media based opinions associated with said Website reviews and said emotions with respect to each said composite score;

transmitting, by said computer processor, each said weighted score through an application program interface hardware circuit;

storing within a structured repository, each said weighted score;

bundling, by said application program interface, results of an outcome rating into a bundle;

applying, by said application program interface, said bundle as feedback to a Website;

generating, by said feedback analyzer, feedback associated with a transaction experience determining how a consumer interpreted a process of purchasing a product or service;

generating, by said feedback analyzer, feedback associated with a price specifying a value for money exchanged;

generating, by said feedback analyzer, feedback associated with a determination as to whether a product or service is rated based on current trending;

generating, by said feedback analyzer, feedback associated with a service describing feedback with respect to a type of service received after a transaction has been completed;

generating, by said feedback analyzer, feedback associated with a determination with respect to a satisfaction level for a product and a service; and generating, by said feedback analyzer, a software solution for ingesting said feedback from a database comprising said structured data and said unstructured data being analyzed by a psycholinguistic scoring process executing models leveraging a psycholinguistic library database for generating recommended steps for improvement for interpreting reviews associated with user satisfaction.

2. The method of claim 1, further comprising:
generating, by said computer processor based on each said composite score for each said group, an analysis report ranking said product or service.

3. The method of claim 1, wherein said categories comprise a transaction experience category, a price category, a fashion category, a service category, and a delivery category.

4. The method of claim 1, wherein said context change comprises a change of nouns used with respect to said keyword.

5. The method of claim 1, wherein said structured data comprises survey data, consumer reports data, and transaction data, and wherein said unstructured data comprises product/service review data, social media data, call-in data, call center data, and service record data.

6. The method of claim 1, wherein each said score for each segment of each said plurality of segments for each said group comprises a scoring range.

7. The method of claim 1, wherein each said score for each segment of each said plurality of segments for each said group is generated based on: an analysis of word frequency in said consumer feedback data, an analysis of phrasing in said consumer feedback data, and sentiment analysis of said consumer feedback data.

8. The method of claim 1, further comprising:
applying, by said computer processor, a weighting factor to each said score for each segment of each said plurality of segments for each said group; and
generating, by said computer processor based on said applying, a weighted score for each said score for each segment of each said plurality of segments for each said group.

9. The method of claim 1, further comprising:
displaying, by said computer processor, each said weighted score.

10. The method of claim 1, further comprising:
providing at least one support service for at least one of creating, integrating, hosting, maintaining, and deploying computer-readable code in the computing system, said code being executed by the computer processor to implement said accessing, said receiving, said dividing, said analyzing, said generating said score, and said generating said composite score.

11. A computing system comprising a feedback analysis system comprising a computer processor coupled to a computer-readable memory unit, said memory unit comprising instructions that when executed by the computer processor implements a social media network stream feedback improvement method comprising:
    accessing, by said computer processor, a keyword and word mapping database comprising keywords and phrases indicating positive and negative sentiments with respect to products and services;
    identifying a source social media data stream via a fixed URL structure and associated hashtags;
    receiving, by said computer processor, said source social media data stream comprising consumer feedback data associated with a product or service, wherein said consumer feedback data comprises feedback data groups, each of the feedback data groups being associated with a data source, wherein said consumer feedback data comprises structured data and unstructured data, and wherein said consumer feedback data comprises voice to text converted data;
    mapping, by said computer processor, said structured data and unstructured data into a consumer data feedback hub;
    dividing, by said computer processor based on word analysis, each said group into a plurality of segments, wherein each segment of each said plurality of segments for each said group is associated with a category of a list of categories;
    analyzing, by a feedback analyzer executing a psycholinguistic scoring engine with respect to said keyword and word mapping database, each segment of each said plurality of segments for each said group, wherein said analyzing comprises;
        performing a text analysis process with respect to text within each segment of each said plurality of segments for each said group; and
        generating via a machine learning process, by a machine learning circuit, a preprogrammed radius around a keyword within said text, wherein said preprogrammed radius is generated based on: a fixed number of words associated with said keyword, punctuation associated with said keyword, a context change associated with said keyword, or spacing associated with said keyword;
    comparing, by social media analytics circuits, multiple Website reviews from multiple users;
    generating, by said computer processor, a quantitative scoring natural language based table comprising a first plurality of rows and a first plurality of columns intersecting said first plurality of rows to define social media based attributes associated with said Website reviews with respect to quantitative scores associated with said consumer feedback data, wherein said table configures storage of said social media based attributes associated with said Website reviews with respect to said quantitative scores;
    determining, by said computer processor executing said psycholinguistic scoring engine with respect to said Website reviews, emotions of said multiple users;
    instantaneously generating, by said computer processor based on results of said analyzing, said comparing, and said determining said emotions, a real time weighted score for each segment of each said plurality of segments for each said group;
    generating, by a clustering analyzer of said feedback analyzer, a composite score for each said group based on each said score for each segment of each said plurality of segments for each said group;
    generating, by said computer processor, an opinion based table comprising a second plurality of rows and a second plurality of columns intersecting said second plurality of rows to define social media based opinions associated with said Website reviews and said emotions with respect to each said composite score, wherein said opinion based table configures storage of said social media based opinions associated with said Website reviews and said emotions with respect to each said composite score;
    transmitting, by said computer processor, each said weighted score through an application program interface hardware circuit;
    storing within a structured repository, each said weighted score;
    bundling, by said application program interface, results of an outcome rating into a bundle;
    applying, by said application program interface, said bundle as feedback to a Website;
    generating, by said feedback analyzer, feedback associated with a transaction experience determining how a consumer interpreted a process of purchasing a product or service;
    generating, by said feedback analyzer, feedback associated with a price specifying a value for money exchanged;
    generating, by said feedback analyzer, feedback associated with a determination as to whether a product or service is rated based on current trending;
    generating, by said feedback analyzer, feedback associated with a service describing feedback with respect to a type of service received after a transaction has been completed;
    generating, by said feedback analyzer, feedback associated with a determination with respect to a satisfaction level for a product and a service; and
    generating, by said feedback analyzer, a software solution for ingesting said feedback from a database comprising said structured data and said unstructured data being analyzed by a psycholinguistic scoring process executing models leveraging a psycholinguistic library database for generating recommended steps for improvement for interpreting reviews associated with user satisfaction.

12. The computing system of claim 11, wherein said method further comprises:
    generating, by said computer processor based on each said composite score for each said group, an analysis report ranking said product or service.

13. The computing system of claim 11, wherein said categories comprise a transaction experience category, a price category, a fashion category, a service category, and a delivery category.

14. The computing system of claim 11, wherein said context change comprises a change of nouns used with respect to said keyword.

15. A computer program product for analysis, the computer program product comprising:
    one or more computer-readable, non-transitory tangible storage devices; program instructions, stored on at least one of the one or more storage devices, to access a keyword and word mapping database comprising keywords and phrases indicating positive and negative sentiments with respect to products and services;

program instructions, stored on at least one of the one or more storage devices to identify a source social media data stream via a fixed URL structure and associated hashtags;

program instructions, stored on at least one of the one or more storage devices, to receive said source social media data stream comprising consumer feedback data associated with a product or service, wherein said consumer feedback data comprises feedback data groups, each of the feedback data groups being associated with a data source, wherein said consumer feedback data comprises structured data and unstructured data, and wherein said consumer feedback data comprises voice to text converted data;

program instructions, stored on at least one of the one or more storage devices, to map said structured data and unstructured data into a-consumer data feedback hub;

program instructions, stored on at least one of the one or more storage devices, to divide based on word analysis, each said group into a plurality of segments, wherein each segment of each said plurality of segments for each said group is associated with a category of a list of categories;

program instructions, stored on at least one of the one or more storage devices, to analyze by a feedback analyzer, executing a psycholinguistic scoring engine with respect to said keyword and word mapping database, each segment of each said plurality of segments for each said group by;

performing a text analysis process with respect to text within each segment of each said plurality of segments for each said group; and generating via a machine learning process, by a machine learning circuit, a preprogrammed radius around a keyword within said text, wherein said preprogrammed radius is generated based on: a fixed number of words associated with said keyword, punctuation associated with said keyword, a context change associated with said keyword, or spacing associated with said keyword;

program instructions, stored on at least one of the one or more storage devices, to compare by social media analytics circuits, multiple Website reviews from multiple users;

program instructions, stored on at least one of the one or more storage devices, to generate a quantitative scoring natural language based table comprising a first plurality of rows and a first plurality of columns intersecting said first plurality of rows to define social media based attributes associated with said Website reviews with respect to quantitative scores associated with said consumer feedback data, wherein said table configures storage of said social media based attributes associated with said Website reviews with respect to said quantitative scores;

program instructions, stored on at least one of the one or more storage devices, to determine by said computer processor executing said psycholinguistic scoring engine with respect to said Website reviews, emotions of said multiple users;

program instructions, stored on at least one of the one or more storage devices, to instantaneously generate, based on results of the analysis, the comparison, and determining the emotions, a weighted score for each segment of each said plurality of segments for each said group;

program instructions, stored on at least one of the one or more storage devices, to generate, by a clustering analyzer of said feedback analyzer, a composite score for each said group based on each said score for each segment of each said plurality of segments for each said group;

program instructions, stored on at least one of the one or more storage devices, to generate an opinion based table comprising a second plurality of rows and a second plurality of columns intersecting said second plurality of rows to define social media based opinions associated with said Website reviews and said emotions with respect to each said composite score, wherein said opinion based table configures storage of said social media based opinions associated with said Website reviews and said emotions with respect to each said composite score;

program instructions, stored on at least one of the one or more storage devices, to transmit each said weighted score through an application program interface;

program instructions, stored on at least one of the one or more storage devices, to store within a structured repository, each said weighted score;

program instructions, stored on at least one of the one or more storage devices to bundle by said application program interface, results of an outcome rating into a bundle;

program instructions, stored on at least one of the one or more storage devices to apply, by said application program interface, said bundle as feedback to a Website;

program instructions, stored on at least one of the one or more storage devices to generate, by said feedback analyzer, feedback associated with a transaction experience determining how a consumer interpreted a process of purchasing a product or service;

program instructions, stored on at least one of the one or more storage devices to generate by said feedback analyzer, feedback associated with a price specifying a value for money exchanged;

program instructions, stored on at least one of the one or more storage devices to generate, by said feedback analyzer, feedback associated with a determination as to whether a product or service is rated based on current trending;

program instructions, stored on at least one of the one or more storage devices to generate, by said feedback analyzer, feedback associated with a service describing feedback with respect to a type of service received after a transaction has been completed;

program instructions, stored on at least one of the one or more storage devices to generate, by said feedback analyzer, feedback associated with a determination with respect to a satisfaction level for a product and a service; and program instructions, stored on at least one of the one or more storage devices to generate, by said feedback analyzer, a software solution for ingesting said feedback from a database comprising said structured data and said unstructured data being analyzed by a psycholinguistic scoring process executing models leveraging a psycholinguistic library database for generating recommended steps for improvement for interpreting reviews associated with user satisfaction.

\* \* \* \* \*

UNITED STATES PATENT AND TRADEMARK OFFICE
CERTIFICATE OF CORRECTION

| | | |
|---|---|---|
| PATENT NO. | : 9,799,035 B2 | Page 1 of 1 |
| APPLICATION NO. | : 14/037968 | |
| DATED | : October 24, 2017 | |
| INVENTOR(S) | : Karl J. Cama, Norbert Herman and Daniel Lambert | |

It is certified that error appears in the above-identified patent and that said Letters Patent is hereby corrected as shown below:

On the Title Page

Item (72)/Inventors, please change:
"Daniel Lambert" to --Daniel T. Lambert--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*